(12) United States Patent
Cao et al.

(10) Patent No.: US 12,719,510 B2
(45) Date of Patent: Aug. 25, 2026

(54) INTEGRATED CONTROL INTERFACE ELIMINATING SERIAL DIE-TO-DIE DELAY TIME

(71) Applicant: SKYWORKS SOLUTIONS, INC., Irvine, CA (US)

(72) Inventors: Haibo Cao, Newbury Park, CA (US); David Richard Pehlke, Westlake Village, CA (US)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 563 days.

(21) Appl. No.: 17/818,751

(22) Filed: Aug. 10, 2022

(65) Prior Publication Data

US 2023/0048478 A1 Feb. 16, 2023

Related U.S. Application Data

(60) Provisional application No. 63/231,982, filed on Aug. 11, 2021.

(51) Int. Cl.
*H04B 1/00* (2006.01)
*H04W 52/52* (2009.01)

(52) U.S. Cl.
CPC ............ *H04B 1/006* (2013.01); *H04W 52/52* (2013.01)

(58) Field of Classification Search
CPC ............................... H04B 1/006; H04W 52/52
See application file for complete search history.

(56) References Cited

U.S. PATENT DOCUMENTS 10,643,962 B1 * 5/2020 Ichitsubo ............. H04B 1/0483
11,177,841 B2 * 11/2021 Ono ...................... H04W 76/16
12,028,026 B2 * 7/2024 Tsuchida .................. H03F 1/56
2008/0166984 A1 * 7/2008 Shie ......................... H04B 1/18 330/296
2010/0178879 A1 * 7/2010 Sato ........................ H03F 3/195 455/127.1
2010/0225414 A1 * 9/2010 Gorbachov .......... H04B 7/0817 333/101
2010/0277252 A1 * 11/2010 Gorbachov ........... H03F 1/0261 333/104
2012/0139006 A1 * 6/2012 Zampardi, Jr ....... H10D 10/021 438/189
2013/0043946 A1 * 2/2013 Hadjichristos .......... H03F 1/223 330/252
2014/0256271 A1 * 9/2014 Kok ......................... H04B 1/44 455/78
2014/0307836 A1 * 10/2014 Khlat ....................... H04B 1/04 375/343
2015/0303971 A1 * 10/2015 Reisner .................... H04B 1/40 330/307
2015/0311874 A1 * 10/2015 Samelis .................. H03F 3/245 455/114.1
2016/0079934 A1 * 3/2016 Ichitsubo ............... H04B 1/006 330/251

(Continued)

*Primary Examiner* — Jinsong Hu
*Assistant Examiner* — Rui M Hu
(74) *Attorney, Agent, or Firm* — Lando & Anastasi, LLP

(57) ABSTRACT

Aspects of the disclosure include a die and corresponding radio-frequency module and wireless mobile device. Examples of the die include, integral to the die, a power amplifier controller, a low noise amplifier, and an antenna switch in communication with both the power amplifier controller and the low noise amplifier.

22 Claims, 7 Drawing Sheets

(56) References Cited

U.S. PATENT DOCUMENTS

2016/0134414 A1* 5/2016 Pehlke ................. H04B 1/0057 370/280
2017/0063412 A1* 3/2017 Ripley ..................... H04B 1/18
2017/0093442 A1* 3/2017 Jayaraman ............ H04W 52/52
2018/0083665 A1* 3/2018 Sugawara ................ H03H 7/38
2018/0316311 A1* 11/2018 Gebeyehu ............. H03F 1/0216
2020/0195280 A1* 6/2020 Burra ....................... H04B 1/48
2020/0313703 A1* 10/2020 Choi ........................ H04B 1/04
2020/0386627 A1* 12/2020 Tokuda .................... G01K 7/20
2021/0091796 A1* 3/2021 Shinozaki ............ H04B 1/0053
2021/0091807 A1* 3/2021 Shinozaki ............ H04B 1/0475
2021/0099190 A1* 4/2021 Uejima ..................... H03F 3/72
2021/0099191 A1* 4/2021 Uejima ................... H03F 3/245
2021/0152195 A1* 5/2021 Uejima ................ H04B 1/0067
2021/0152202 A1* 5/2021 Uejima ................ H04B 1/0458
2021/0152210 A1* 5/2021 Uejima .................... H04B 1/18
2021/0273670 A1* 9/2021 Yasuda ................ H04B 1/1615
2021/0351802 A1* 11/2021 Murase .................. H03H 9/725
2021/0376867 A1* 12/2021 Tada ...................... H04B 1/006
2021/0384926 A1* 12/2021 Nakajima ................ H04B 1/04
2021/0391321 A1* 12/2021 Dutta ................. H10D 84/0107
2022/0021357 A1* 1/2022 Takeuchi ................. H04B 1/40
2022/0077595 A1* 3/2022 Takayama ............ H01Q 21/065
2022/0102296 A1* 3/2022 Kitajima ................ H04B 1/034
2022/0190849 A1* 6/2022 Shinozaki ................ H04B 1/03
2022/0199484 A1* 6/2022 Fukasawa ............... H03F 3/195
2022/0337200 A1* 10/2022 Choi ......................... H03F 1/52
2022/0393706 A1* 12/2022 Yamaguchi .............. H04B 1/04
2023/0291427 A1* 9/2023 Tanoue .................. H04B 1/006
2024/0056146 A1* 2/2024 An ........................ H04L 5/1469
2024/0223223 A1* 7/2024 Nakajima ................ H04B 1/00
2024/0372571 A1* 11/2024 Shinozaki ................ H04B 1/03

* cited by examiner

105
PA CONTROLLER
111
113
PA
LNA
MCM
117

INTEGRATED CONTROL INTERFACE ELIMINATING SERIAL DIE-TO-DIE DELAY TIME

CROSS-REFERENCE TO RELATED APPLICATIONS

This application claims priority under 35 U.S.C. § 119(e) to U.S. Provisional Application Ser. No. 63/231,982, titled "INTEGRATED CONTROL INTERFACE ELIMINATING SERIAL DIE-TO-DIE-DELAY TIME," filed on Aug. 11, 2021, which is hereby incorporated by reference in its entirety.

BACKGROUND

Field

Examples of the disclosure relate to die, radio-frequency modules, and wireless mobile devices having integrated components.

Description of the Related Technology

Modern communication protocols such as 5G New Radio (NR) benefit from faster transition times for OFF-to-ON, ON-to-OFF, and changes in gain/mode for both the transmit chain (pre-power amplifier [PA] switch, PA, band select switch, antenna switch module [ASM]) and in the receive chain (ASM, low-noise amplifier [LNA], pre/post LNA switching). The tighter timing specifications result from a reduction in the allowed inter-slot timing and the shorter cyclic prefix (CP) of 5G NR due to higher bandwidth sub-carrier spacing (SCS). For example, LTE has a fixed SCS of 15 KHz with a CP of 4.7 μs. By comparison, 5G NR may have a similar CP as LTE at 14 KHz, at a SCS of 30 KHz the CP reduces to 2.35 μs, and at a SCS of 60 KHz the CP is reduced further to 1.17 μs. As it may be advantageous to limit any gain error within the CP, this imposes timing limits on the transmit and receive chains.

When the serial radio frequency front end (RFFE) mobile industry processor interface (MiPi) is programmed, the resulting timing for how long it takes the active transmit ($T_x$) chain and active receive ($R_x$) chains to react and affect the desired change (such as a gain step, mode change, and so forth) hence become more critical for 5G NR due to the tighter timing restraints. Further complications are introduced because the required modules are implemented on separate silicon complementary metal—oxide—semiconductor (CMOS) and silicon-on-insulator (SOI) die which are separated in the layout of the module design. This introduces the need for additional serial interfaces for communication between these separate die in order to minimize die area, for example due to bond pad frame and routing complexity limitations. These additional serial interfaces require further time to clock in the resulting programming and affect the final desired change in the programming of the different modules that are remotely positioned on separate die. This additional delay is undesired and makes it difficult to meet the strict timing constraints of communication protocols such as 5G NR.

SUMMARY

According to one example there is provided a die comprising, integral to the die: a power amplifier controller; a low noise amplifier; and an antenna switch in communication with both the power amplifier controller and the low noise amplifier.

In one example, the die further comprises a band select switch integral to the die, the band select switch being in communication with the power amplifier controller.

In one example, the die further comprises a receive path connection for connecting to a receive path MiPi. In one example, the receive path connection for connecting to a receive path MiPi is in communication with the low noise amplifier.

In one example, the die further comprises a transmit path connection for connecting to a transmit path MiPi. In one example, the transmit path connection for connecting to a transmit path MiPi is in communication with the power amplifier controller.

In one example, the power amplifier controller has a power amplifier connection for connecting to a power amplifier external to the die.

In one example, the die further comprises a receive path connection and a transmit path connection for connecting to a single MiPi supporting both transmit path and receive path. In one example, the receive path connection is in communication with the low noise amplifier. In one example, the transmit path connection is in communication with the power amplifier controller.

According to one example there is provided a radio-frequency module comprising: a die having, integral to the die, a power amplifier controller, a low noise amplifier, and an antenna switch in communication with both the power amplifier controller and the low noise amplifier; and a power amplifier, the power amplifier being in communication with, and physically separated from, the die.

In one example, the die has, integral to the die, a band select switch, the band select switch being in communication with the power amplifier controller.

In one example, the die further comprises a receive path connection for connecting to a receive path MiPi. In one example, the receive path connection for connecting to a receive path MiPi is in communication with the low noise amplifier.

In one example, the die further comprises a transmit path connection for connecting to a transmit path MiPi. In one example, the transmit path connection for connecting to a transmit path MiPi is in communication with the power amplifier controller.

In one example, the die and the power amplifier are disposed upon a multi-chip module. In one example, the die is disposed on a first side of the multi-chip module and the power amplifier is also disposed on the first side of the multi-chip module. In one example, the die is disposed on a first side of the multi-chip module and the power amplifier is disposed on a second side of the multi-chip module.

In one example, the die further comprises a receive path connection and a transmit path connection for connecting to a single MiPi supporting both the transmit path and the receive path. In one example, the receive path connection is in communication with the low noise amplifier. In one example, the transmit path connection is in communication with the power amplifier controller.

According to one example there is provided a wireless mobile device comprising: one or more antennas; and a radio-frequency module that communicates with the one or more antennas, the radio-frequency module having a die, the die having, integral to the die, a power amplifier controller, a low noise amplifier, and an antenna switch in communication with both the power amplifier controller and the low noise amplifier; the radio-frequency module also having a power amplifier, the power amplifier being in communication with, and physically separated from, the die.

In one example, the die further comprises a band select switch.

In one example, the die further comprises a receive path connection for connecting to a receive path MiPi. In one example, the receive path connection for connecting to a receive path MiPi is in communication with the low noise amplifier.

In one example, the die further comprises a transmit path connection for connecting to a transmit path MiPi. In one example, the transmit path connection for connecting to a transmit path MiPi is in communication with the power amplifier controller.

In one example, the die and the power amplifier are disposed upon a multi-chip module. In one example, the die is disposed on a first side of the multi-chip module and the power amplifier is also disposed on the first side of the multi-chip module. In one example, the die is disposed on a first side of the multi-chip module and the power amplifier is disposed on a second side of the multi-chip module.

In one example, the die further comprises a receive path connection and a transmit path connection for connecting to a single MiPi supporting both transmit path and receive path. In one example, the receive path connection is in communication with the low noise amplifier. In one example, the transmit path connection is in communication with the power amplifier controller.

Still other aspects, embodiments, and advantages of these exemplary aspects and embodiments are discussed in detail below. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and examples described herein are directed to a die, a radio-frequency front end (RFFE), and a wireless mobile device. Examples of the die, RFFE, and wireless mobile device integrate components onto a single chip to reduce the latency associated with configuring parameters for transmitting and receiving.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
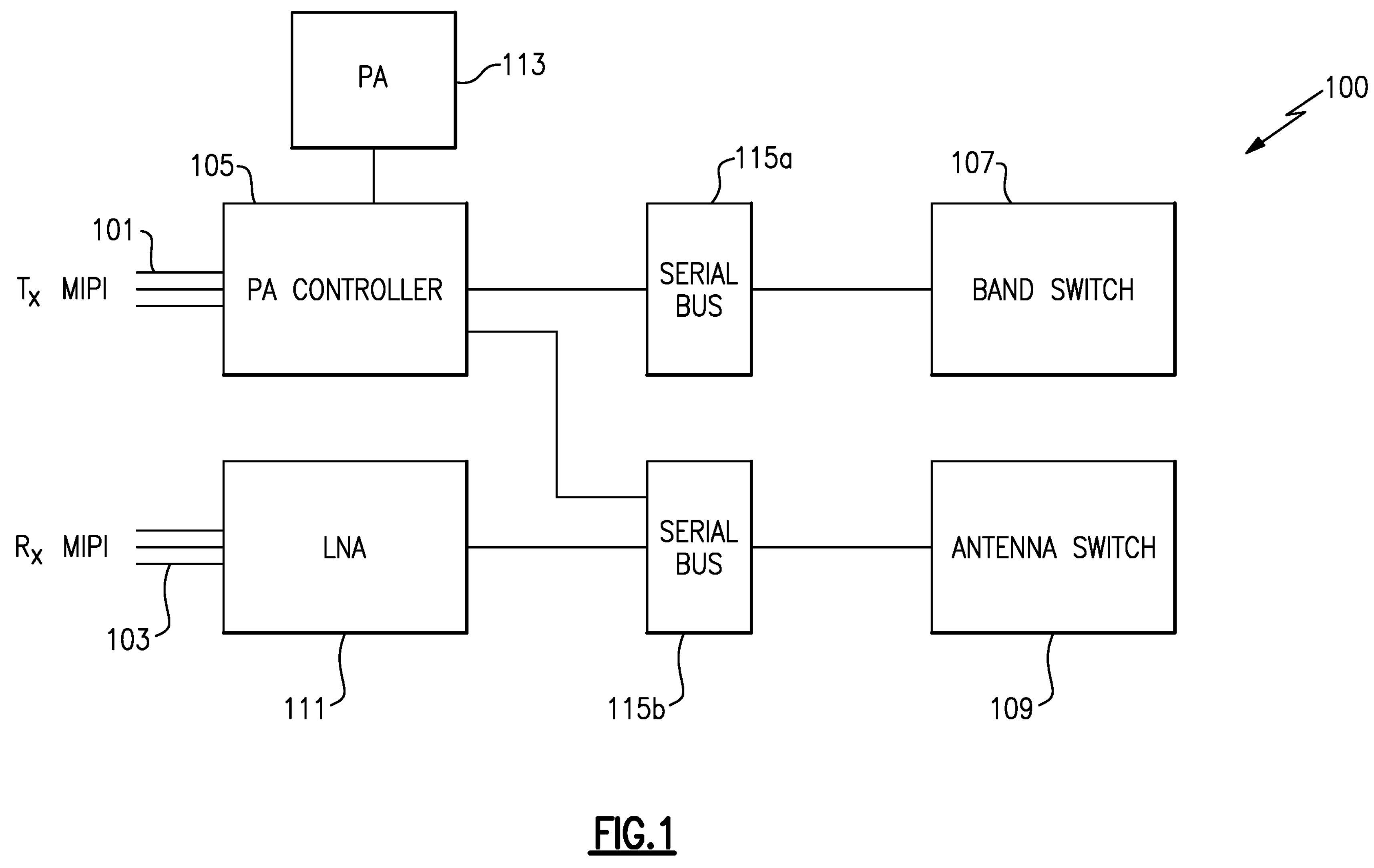
FIG. 1 illustrates a block diagram of a radio-frequency front end.

FIG. 1 illustrates a schematic of a radio-frequency front end (RFFE) 100, which is sometimes referred to as a front end module (FEM). The RFFE 100 connects to other components along the transmit ($T_x$) path via the $T_x$ MiPi (Mobile Industry Processor Interface) connection 101 and to other components along the receive ($R_x$) path via the $R_x$ MiPi 103. The $T_x$ MiPi feeds into the power amplifier (PA) controller 105, which is in turn connected to the PA 113. The PA controller 105 also connects to the band switch 107 and antenna switch 109, sometimes referred to as an antenna switch module (ASM). This is achieved via serial bus 115*a* and serial bus 115*b* respectively. The ASM 109 also connects to the low-noise amplifier (LNA) 111 via serial bus 115*b*, the LNA in turn being connected to the $R_x$ Mipi 103.

In this way, via the serial bus 115*b*, the ASM 109 is connected in both the $T_x$ and $R_x$ paths. Because the ASM 109 is required in both the $T_x$ and $R_x$ paths, the isolation requirements of these paths may be a relevant design parameter, particularly for frequency division duplexing (FDD) bands when both the $T_x$ and $R_x$ paths may be active at the same time. Typically, there may be an isolation requirement of 70 dB between the $T_x$ and $R_x$ paths, which may be achieved as noted above by separating the components of the $T_x$ and $R_x$ paths and utilizing one or more of the serial buses 115*a*, 115*b* to enable communication between components.

Figures 2A, 2B:
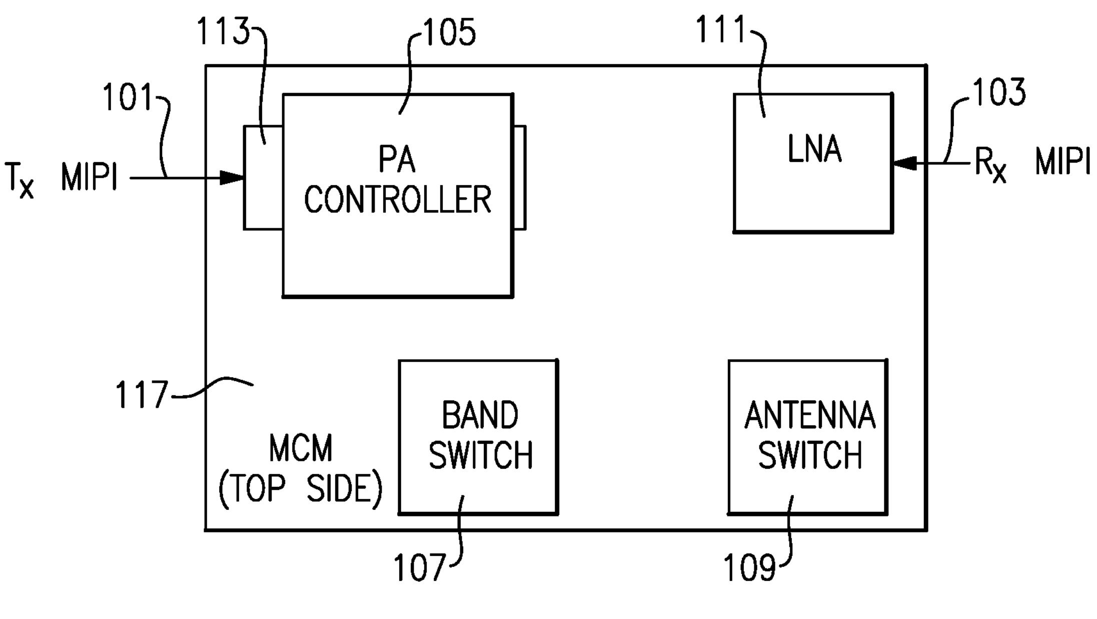
FIG. 2A illustrates a plan view of a radio-frequency front end on a multi-chip module.
FIG. 2B illustrates a plan view of a radio-frequency front end on the multi-chip module of FIG. 2A.

FIGS. 2A and 2B illustrate how such components may be arranged on a multi-chip module (MCM). FIG. 2A illustrates a top plan view of an MCM 117. FIG. 2B illustrates a side plan view of the MCM 117. The LNA 111, ASM 109 and band switch 107 are arranged as separate components formed on separate dies or chips on the MCM 117. The PA 103 and PA controller 105 are arranged stacked on top of each other, as is most clearly seen in FIG. 2B. Again, the PA 103 and PA controller 105 are separate components from the LNA 111, ASM 109 and band switch 107. Again, as with FIG. 1, the $T_x$ MiPi 101 connects to the PA controller 105 whereas the $R_x$ MiPi 103 connects to the LNA 111.

Figure 3A:
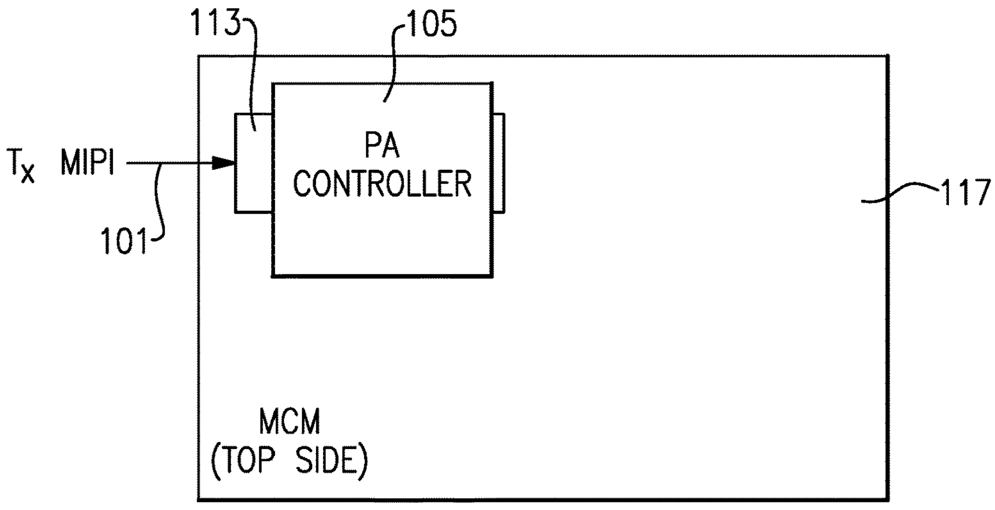
FIG. 3A illustrates a plan view of a radio-frequency front end on a multi-chip module.
Figure 3B:
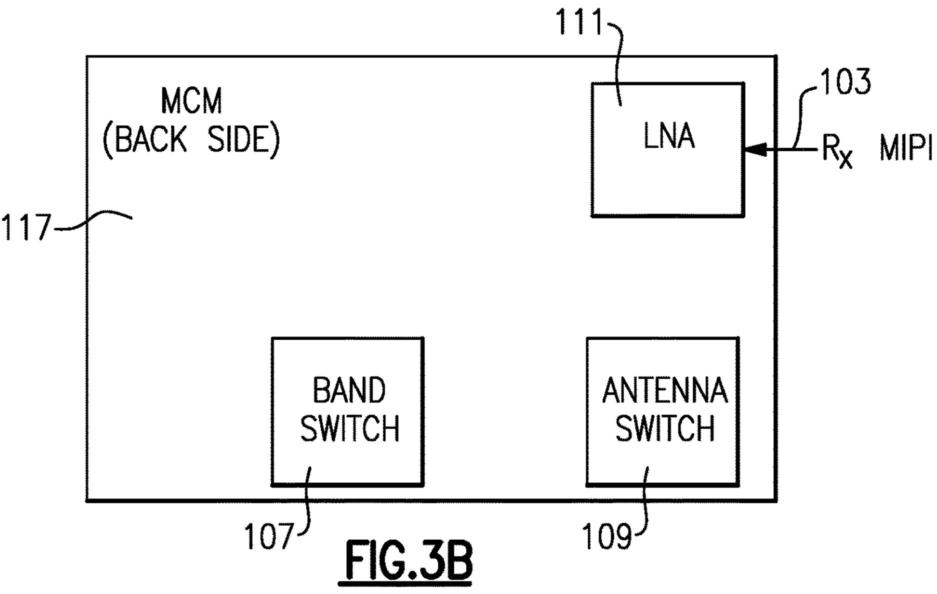
FIG. 3B illustrates a reverse plan view of the radio-frequency front end on the multi-chip module of FIG. 3A.
Figure 3C:
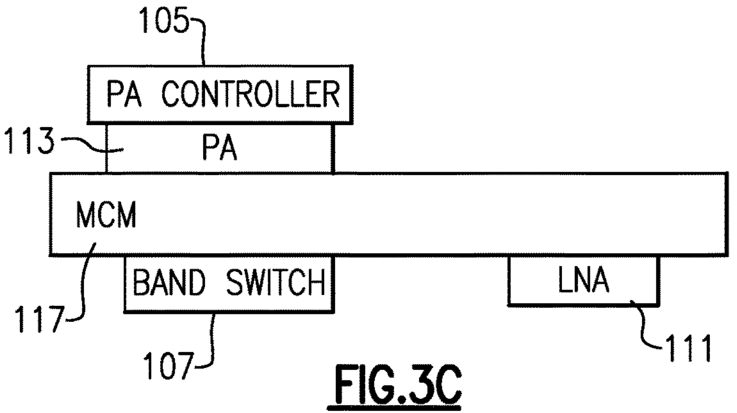
FIG. 3C illustrates a cross section of the arrangement of a prior art radio-frequency front end on a multi-chip module of FIG. 3A.

An alternative arrangement of the components of an RFFE is illustrated in FIGS. 3A, 3B, and 3C. FIGS. 3A-3C illustrate an MCM 117 in a dual-sided configuration. FIG. 3A illustrates a top side of MCM 117 having the PA controller 105 and the PA 113, whereas FIG. 3B illustrates a back side having the LNA 111, the ASM 109, and the band switch 107. FIG. 3C illustrates a side view of MCM 117. Again, as with FIG. 1, the Tx MiPi 101 connects to the PA controller 105 whereas the Rx MiPi 103 connects to the LNA 111.

The components shown in FIGS. 2A and 2B and FIGS. 3A-3C may be connected as illustrated in FIG. 1, though the serial buses 115A, 115B are not shown in FIGS. 2A, 2B, 3A, 3B and 3C for clarity. In practice the components will be located on the MCM where there is appropriate room in accordance with known principles of designing and arranging die and MCMs. However, as noted above, the use of such serial buses introduces unwanted latency into the $T_x$ and $R_x$ paths, which is particularly problematic with the introduction of 5G new radio (NR). Accordingly, aspects of the present disclosure provide a radio-frequency (RF) module (such as an RFFE or FEM) wherein the PA controller 105, the band switch 107, the antenna switch 109 (or ASM) and the LNA 111 are integrated onto a single die or chip.

Figure 4A:
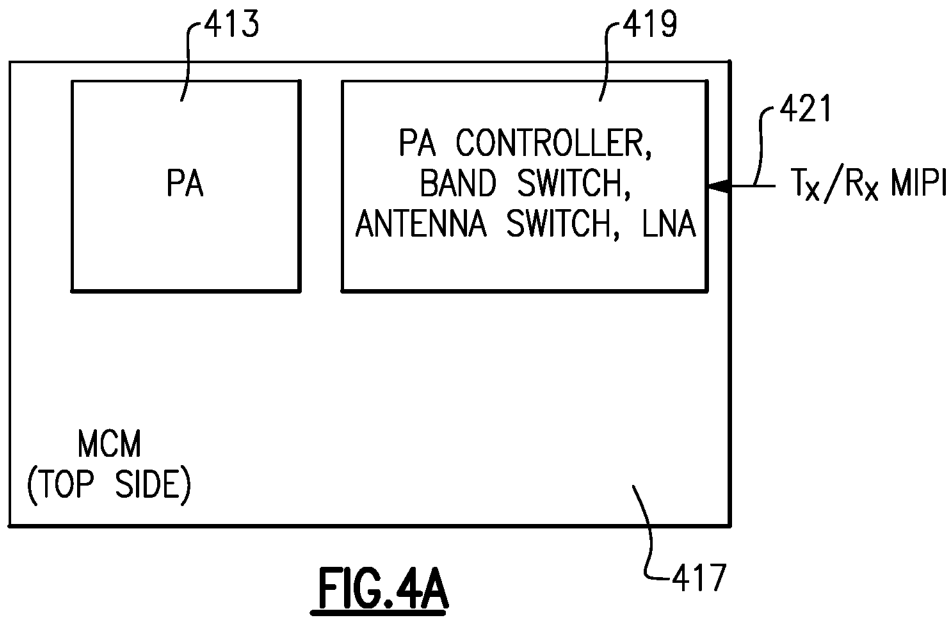
FIG. 4A illustrates a plan view of an arrangement of a radio-frequency front end on a multi-chip module according to an example.
Figure 4B:
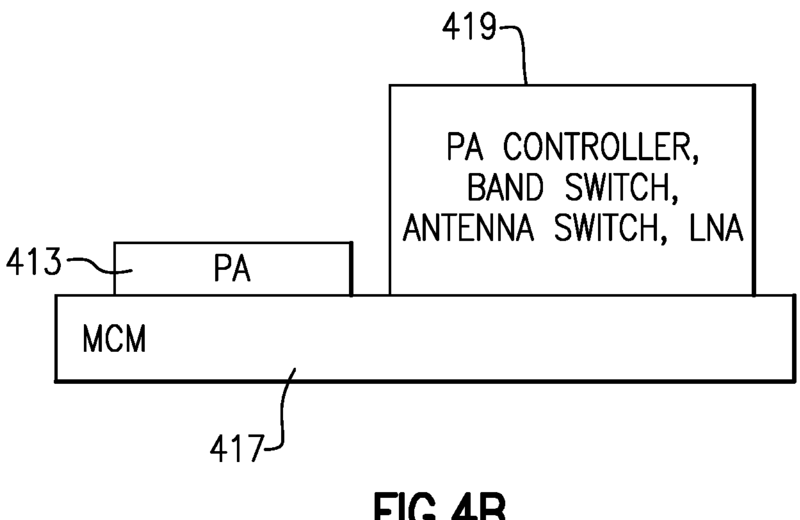
FIG. 4B illustrates a cross-section of the arrangement of a radio-frequency front end on the multi-chip module of FIG. 4A according to an example.
Figure 5A:
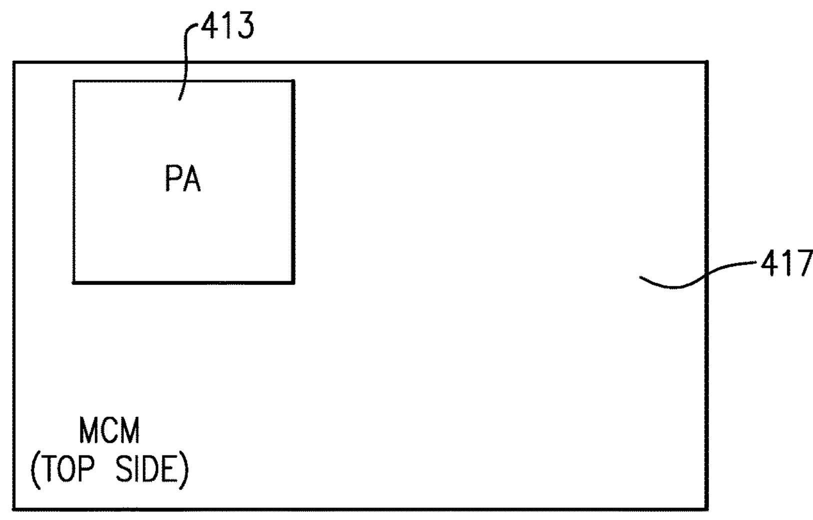
FIG. 5A illustrates a plan view of an arrangement of a radio-frequency front end on a multi-chip module according to an example.
Figure 5B:
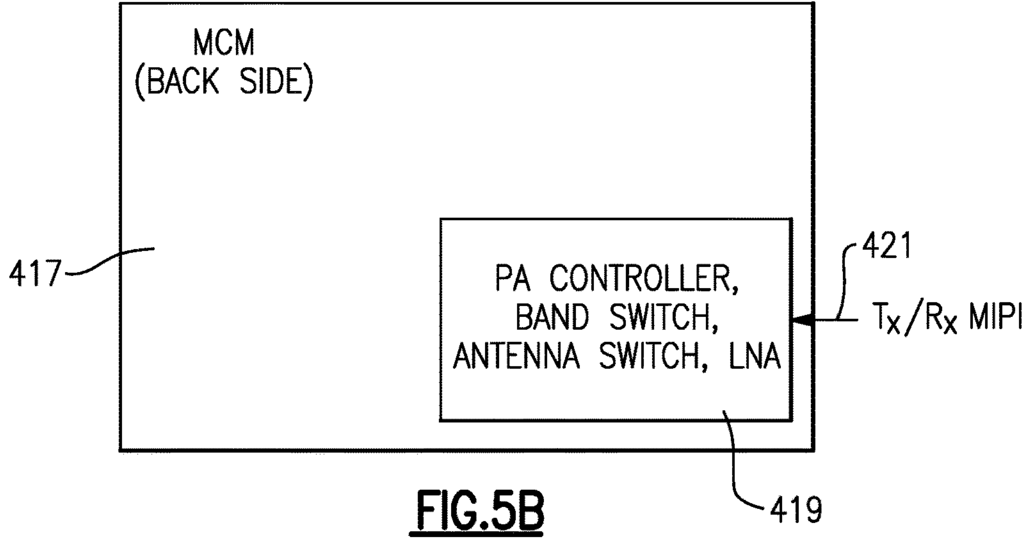
FIG. 5B illustrates a reverse view of the arrangement of the radio-frequency front end on the multi-chip module of FIG. 5A according to an example.
Figure 5C:
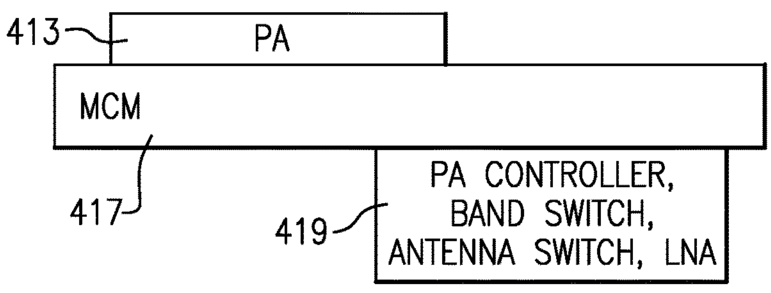
FIG. 5C illustrates a cross section of the arrangement of the radio-frequency front end on the multi-chip module of FIG. 5A according to an example.

Such an RF module is illustrated in FIGS. 4A and 4B. The RF module comprises an MCM 417 having a PA 413 and a die 419 with integrated PA controller, band switch, ASM and LNA. The die 419 has a $T_x$/$R_x$ MiPi connection 421. In this instance, both the PA 413 and die 419 are disposed on the same side of the MCM 417. However, FIGS. 5A, 5B, and 5C illustrate another aspect of the disclosure in which the PA 413 and die 419 are disposed on opposite sides of MCM 417.

Figure 6:
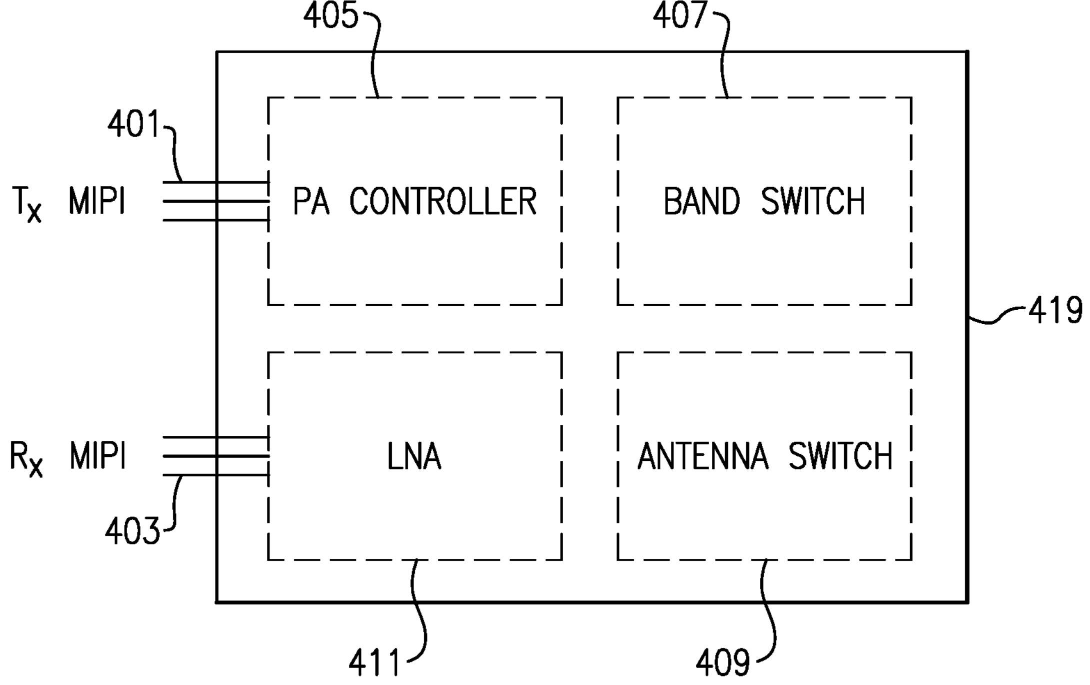
FIG. 6 illustrates a schematic of a die according to an example.

FIG. 6 illustrates a schematic of the die 419 according to aspects of the disclosure, showing the PA controller 405, the band switch 407, the ASM 409, and the LNA 411 integral to the die 419. FIG. 6 also shows the $T_x$ MiPi 401 connecting with the PA controller 405 and the $R_x$ MiPi 403 connecting with the LNA 411. With the PA controller 405 no longer stacked on the PA 413, the PA controller 405 can be integrated with the band switch 407, the ASM 409, and the LNA 411 while still meeting the isolation requirements of 5G NR, more easily in time-division duplexing (TDD) bands but also in frequency-division duplexing (FDD) bands. This means that the use of serial buses can be eliminated, reducing a large source of latency within the system.

While FIG. 6 illustrates an example in which the $T_x$ MiPi 401 and the $R_x$ MiPi 403 are separate connections, in some cases a single MiPi could be provided that supports both the $T_x$ path and the $R_x$ path. In this case, the die may be provided with a transmit-path connection and a receive-path connection configured to be connected to the single MiPi. An example of this combined connection is shown in FIGS. 4A and 5B, labelled as $T_x$/$R_x$ MiPi 421.

Figure 7:
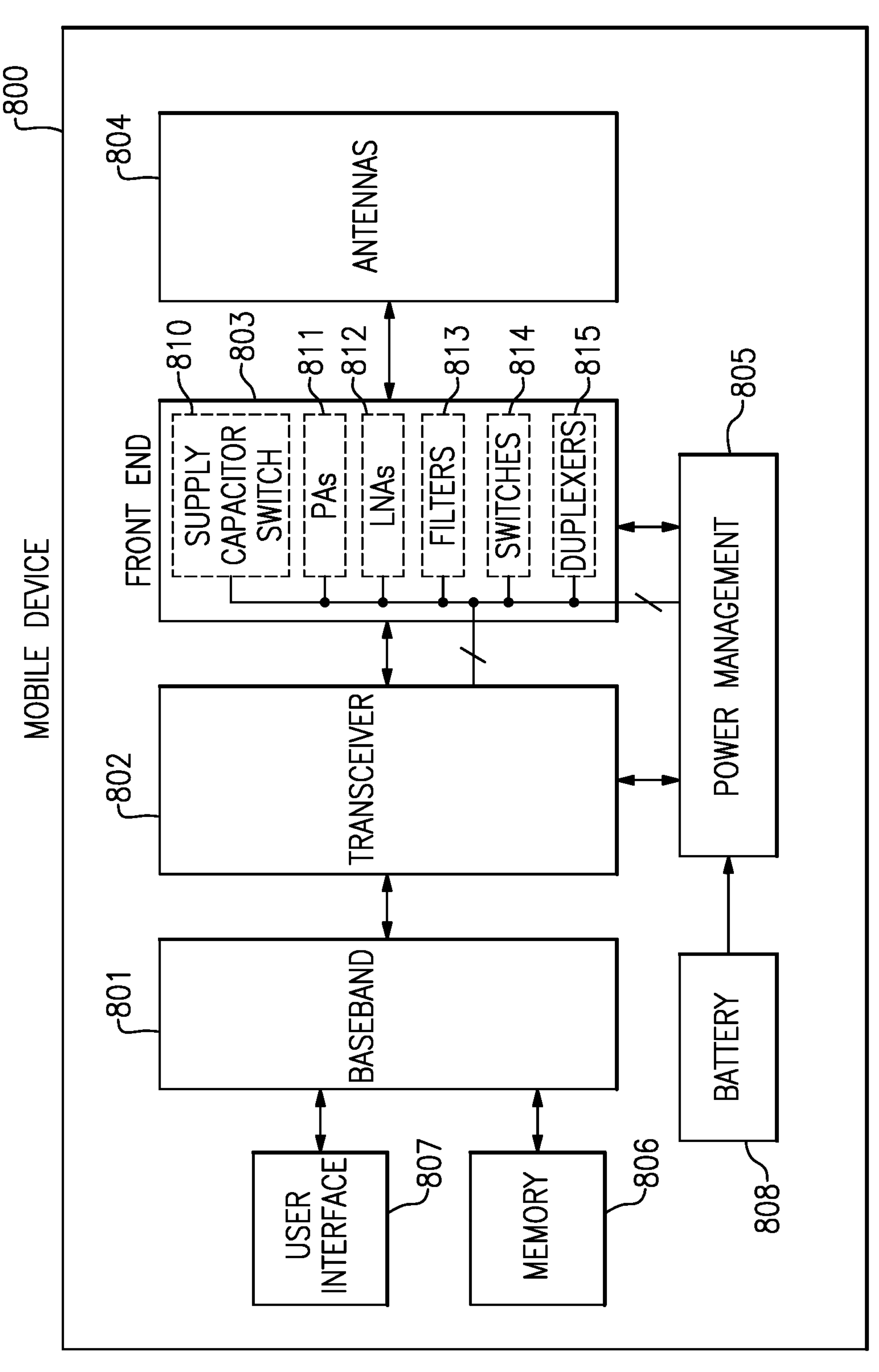
FIG. 7 illustrates a schematic of a wireless device according to an example.

Another aspect of the disclosure provides a wireless mobile device comprising the RF module of FIGS. 4A to 6. For example, the wireless mobile device may comprise the RF module of FIG. 4A or 5A, that is, an RF module having a die including a power amplifier controller, a low-noise amplifier, and an antenna switch, with the antenna switch being in communication with both the power amplifier controller and the low-noise amplifier. A schematic of such a wireless mobile device is illustrated in FIG. 7, with the components of the die illustrated as part of a front end system 803. A wireless device 800 can be, for example but not limited to, a portable telecommunication device such as, a mobile cellular-type telephone. The wireless device 800 may include one or more of a baseband system 801, a transceiver 802, the front end system 803, one or more antennas 804, a power management system 805, a memory 806, a user interface 807, and a battery 808. The user interface 807 transmits signals received via user input to the baseband system 801. The transceiver 802 generates RF signals for transmission and processes incoming RF signals received from the antennas 804. The front end module 803 aids in conditioning signals transmitted to and/or received from the antennas 804. The antennas 804 can include antennas used for a wide variety of types of communications. For example, the antennas 804 can include antennas 804 for transmitting and/or receiving signals associated with a wide variety of frequencies and communications standards. The baseband system 801 is coupled to the user interface 807 to facilitate processing of various user input and output, such as voice and data. The baseband system 801 provides the transceiver 802 with digital representations of transmit signals, which the transceiver 802 processes to generate RF signals for transmission. The baseband system 801 also processes digital representations of received signals provided by the transceiver 802.

As shown in FIG. 7, the baseband system 801 is coupled to the memory 806 to facilitate operation of the wireless device 800. The memory 806 can be used for a wide variety of purposes, such as storing data and/or instructions to facilitate the operation of the wireless device 800 and/or to provide storage of user information. The power management system 805 provides a number of power management functions of the wireless device 800. The power management system 805 receives a battery voltage from the battery 808. The battery 808 can be any suitable battery for use in the wireless device, including, for example, a lithium-ion battery.

The front end system 803 may have various components, including a supply capacitor switch 810, PAs 811, LNAs 812, filters 813, switches 814, such as band select switches and antenna switches, and duplexers 815. These components may be arranged onto one or more die in a RF module. The RF module may be the RF module of FIG. 4A or 5A, for example. That is, the RF module may have a die comprising a band select switch, LNA, PC controller and ASM. These components may be arranged as illustrated in FIG. 6 or as described anywhere herein.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A die comprising:
- a power amplifier controller;
- a low noise amplifier in a receive path;
- an antenna switch module (ASM) in the receive path and a transmit path and in communication with both the power amplifier controller and the low noise amplifier, the ASM being configured to switchably couple the low noise amplifier to each of a plurality of antennas; and
- a band select switch in the transmit path and in communication with the power amplifier controller, the band select switch being communicatively unconnected to the low noise amplifier and communicatively unconnected to the ASM, the power amplifier controller, the low noise amplifier, the ASM, and the band select switch being integral to the die.

2. The die of claim 1 further comprising a receive path connection in the receive path for connecting to a receive path mobile industry processor interface (MiPi).

3. The die of claim 2 wherein the receive path connection in the receive path for connecting to the receive path MiPi is in communication with the low noise amplifier.

4. The die of claim 1 further comprising a transmit path connection in the transmit path for connecting to a transmit path MiPi.

5. The die of claim 4 wherein the transmit path connection in the transmit path for connecting to the transmit path MiPi is in communication with the power amplifier controller.

6. The die of claim 1 wherein the power amplifier controller has a power amplifier connection for connecting to a power amplifier external to the die.

7. A radio-frequency module comprising:
- a die having, integral to the die, a power amplifier controller, a low noise amplifier in a receive path, an antenna switch module (ASM) in the receive path and a transmit path and in communication with both the power amplifier controller and the low noise amplifier, the ASM being configured to switchably couple the low noise amplifier to each of a plurality of antennas, and a band select switch in the transmit path and in communication with the power amplifier controller, the band select switch being communicatively unconnected to the low noise amplifier and communicatively unconnected to the ASM; and
- a power amplifier configured to be in communication with the power amplifier controller and physically separated from the die.

8. The radio-frequency module of claim 7 wherein the die further comprises a receive path connection in the receive path for connecting to a receive path MiPi.

9. The radio-frequency module of claim 8 wherein the receive path connection in the receive path for connecting to the receive path MiPi is in communication with the low noise amplifier.

10. The radio-frequency module of claim 7 wherein the die further comprises a transmit path connection in the transmit path for connecting to a transmit path MiPi.

11. The radio-frequency module of claim 10 wherein the transmit path connection in the transmit path for connecting to the transmit path MiPi is in communication with the power amplifier controller.

12. The radio-frequency module of claim 7 wherein the die and the power amplifier are disposed upon a multi-chip module.

13. The radio-frequency module of claim 12 wherein the die is disposed on a first side of the multi-chip module and the power amplifier is also disposed on the first side of the multi-chip module.

14. The radio-frequency module of claim 12 wherein the die is disposed on a first side of the multi-chip module and the power amplifier is disposed on a second side of the multi-chip module.

15. A wireless mobile device comprising:
- a plurality of antennas; and
- a radio-frequency module that communicates with the plurality of antennas, the radio-frequency module having a die and a power amplifier that is in communication with, and physically separated from, the die, the die having
  - a power amplifier controller, a low noise amplifier in a receive path, an antenna switch module (ASM) in the receive path and a transmit path, and a band select switch in the transmit path, the power amplifier controller, the low noise amplifier, the ASM, and the band select switch being integral to the die, the ASM being configured to switchably couple the low noise amplifier to each of the plurality of antennas and being in communication with both the power amplifier controller and the low noise amplifier, the band select switch being in communication with the power amplifier controller, the band select switch being communicatively unconnected to the low noise amplifier and communicatively unconnected to the ASM.

16. The wireless mobile device of claim 15 wherein the die further comprises a receive path connection in the receive path for connecting to a receive path MiPi.

17. The wireless mobile device of claim 16 wherein the receive path connection in the receive path for connecting to the receive path MiPi is in communication with the low noise amplifier.

18. The wireless mobile device of claim 15 wherein the die further comprises a transmit path connection in the transmit path for connecting to a transmit path MiPi.

19. The wireless mobile device of claim 18 wherein the transmit path connection in the transmit path for connecting to the transmit path MiPi is in communication with the power amplifier controller.

20. The wireless mobile device of claim 15 wherein the die and the power amplifier are disposed upon a multi-chip module.

21. The wireless mobile device of claim 20 wherein the die is disposed on a first side of the multi-chip module and the power amplifier is also disposed on the first side of the multi-chip module.

22. The wireless mobile device of claim 20 wherein the die is disposed on a first side of the multi-chip module and the power amplifier is disposed on a second side of the multi-chip module.

* * * * *